(12) United States Patent
Wang

(10) Patent No.: US 12,438,348 B2
(45) Date of Patent: Oct. 7, 2025

(54) TYING-FREE NETWORK MODULE AND CABLE GLAND

(71) Applicant: Jiangsu Enmane Electronics Industry Co., Ltd, Jiangsu (CN)

(72) Inventor: Chuanbao Wang, Jiangsu (CN)

(73) Assignee: Jiangsu Enmane Electronics Industry Co., Ltd, Kunshan (CN)

( * ) Notice: Subject to any disclaimer, the term of this patent is extended or adjusted under 35 U.S.C. 154(b) by 344 days.

(21) Appl. No.: 18/052,939

(22) Filed: Nov. 7, 2022

(65) Prior Publication Data

US 2024/0047952 A1    Feb. 8, 2024

(30) Foreign Application Priority Data

Aug. 5, 2022  (CN) .......................... 202210939124.0

(51) Int. Cl.
*H02G 3/06* (2006.01)
*H01B 13/012* (2006.01)

(52) U.S. Cl.
CPC ..... *H02G 3/0691* (2013.01); *H01B 13/01209* (2013.01)

(58) Field of Classification Search
CPC ............ H02G 3/0691; H01B 13/01209; H01R 13/5837; H01R 13/5829; H01R 4/2433; H01R 24/64; H01R 13/5812; H01R 13/502; H01R 2201/04
See application file for complete search history.

(56) References Cited

U.S. PATENT DOCUMENTS

| 2020/0156568 A1* | 5/2020 | Nagasawa .......... H01R 13/5812 |
| 2021/0135413 A1* | 5/2021 | Wang ................ H01R 13/2407 |
| 2021/0184394 A1* | 6/2021 | Wang ................ H01R 13/5841 |

FOREIGN PATENT DOCUMENTS

EP    1624534 A2 *  2/2006   ......... H01R 13/6275

* cited by examiner

*Primary Examiner* — Michael C Zarroli

(57) ABSTRACT

The present application discloses a tying-free network module and a cable gland. The tying-free network module disclosed by the present application includes a female seat and a fastener part connected with the female seat. The female seat and the fastener part form an accommodating cavity. The cable clip includes a sheet-shaped base part. An arc-shaped positioning edge is provided on one side, close to the cable, of the base part. At least two clamping grooves are provided in at least one side surface of the base part. When the cable is clamped by using the cable clip, the cable clip is provided in a direction perpendicular to the cable. The overall length of the tying-free network module disclosed by the present application is smaller, and the overall length of the tying-free network module is minimized.

30 Claims, 15 Drawing Sheets

TYING-FREE NETWORK MODULE AND CABLE GLAND

CROSS REFERENCE TO RELATED APPLICATIONS

The present application claims the benefit of Chinese Patent Application No. 202210939124.0 filed on Aug. 5, 2022, the contents of which are incorporated herein by reference in their entirety.

TECHNICAL FIELD

The present application relates to a tying-free network module and a cable gland.

BACKGROUND

The network module is used to establish a connection between one cable and another cable, or between one cable and an electrical or electronic product.

In order to ensure the stable connection between the cable and the network module, when the cable and the network module are connected, it is necessary to provide a cable tie to fix the cable and the network module.

Most of the existing network modules rely on a clamp extending outwards at the end of the interface. After the cable is inserted into the clamp, the cable and the clamp are fixed by using the cable tie. Therefore, most of the tying mechanisms are located outside the network module, which makes the overall length of the network module large. Thus, it is inconvenient to operate during mounting in a small space, thus bringing great inconvenience to use.

SUMMARY

In order to overcome the disadvantages, the purpose of the present application is to provide a tying-free network module and a cable gland.

The present application provides a tying-free network module, including a female seat and a fastener part connected with the female seat, the female seat and the fastener part forming an accommodating cavity, the fastener part being provided with a through hole for a cable to pass through, the fastener part including at least one first fastener hinged with the female seat, wherein the tying-free network module further includes: a cable clip, the cable clip being located in the accommodating cavity, the cable clip being capable of moving towards a direction close to or far away from the cable passing through the through hole in the fastener part, the cable clip including a sheet-shaped base part, an arc-shaped positioning edge being provided on one side of the base part close to the cable, at least two clamping grooves being provided in at least one side surface of the base part; and a clamping part, the clamping part being provided with at least one clamping protrusion capable of being fit with the clamping grooves, the clamping part being provided in the accommodating cavity of the tying-free network module, an opening being provided in the fastener part at a position corresponding to one end of the base part of the cable clip far away from the cable, the cable clip being moved towards the direction of the cable by passing through the opening and applying a force to the cable clip. In the present application, by providing the cable clip and fitting the clamping groove in the cable clip with the clamping part, the clamping between the cable clip and the cable is realized without providing a tying structure at the end of the tying-free network module. In addition, in the present application, the cable clip is located in the tying-free network module. Therefore, the overall length of the tying-free network module is smaller. Since the base part of the cable clip is in a sheet shape, the overall length of the tying-free network module is minimized.

Further, the cable clip further includes a clamping edge provided along the positioning edge and connected with the base part, the clamping edge extends along a length direction of the cable, and the clamping edge extends towards one side surface of the base part far away from the side surface provided with the clamping grooves. Therefore, the cable clip realizes the clamping of the cable through the fitting between the positioning edge provided on one side surface of the cable clip and the clamping protrusion. Moreover, since the extension direction of the clamping edge is directed to the other side surface of the base part of the cable clip, the inner cavity space of the tying-free network module can be effectively utilized, the overall length along the length direction of the cable can be reduced, and the cable can be fully fixed.

Further, each clamping groove is provided with a guide slope and a backstop surface, the clamping protrusion is provided with a clamping surface and a stop surface, and the backstop surface of the clamping groove is capable of abutting against the stop surface of the clamping protrusion. Therefore, during clamping, the guide slope of the clamping groove contacts the clamping surface of the clamping protrusion and moves forward along the clamping surface to clamp the clamping protrusion into the groove body of the clamping groove. After the cable is clamped, when the base part of the cable clip is moved far away from the cable under the expansion force of the cable, the stop surface of the clamping groove abuts against the stop surface of the clamping protrusion, thereby ensuring that the cable clip will not retreat, and thus realizing the clamping and fixation of the cable.

Further, an adjusting groove fit with the base part is further provided in the accommodating cavity, and the base part is capable of moving along the adjusting groove towards a direction close to or far away from the cable.

Further, at least one sliding groove is further provided in the base part, and a slider fit and connected with the sliding groove is provided in the adjusting groove. Therefore, it is ensured that the cable clip moves smoothly and stably towards the cable and can clamp the cable in the center.

Further, a cable gland is further provided in the accommodating cavity, and the clamping part is provided on the cable gland. Therefore, by using the cable gland structure originally provided in the network module, the arrangement size in the longitudinal direction of the network module can be minimized.

Further, an adjusting gap is further provided in the cable gland at a position close to the clamping part. The adjusting gap is located in the front side where the clamping part is pressed down under the force. Therefore, when the clamping part is pressed, sufficient adjustment space can be provided to ensure that the clamping part can be smoothly clamped into the target clamping groove when the cable clip is moved forward.

Further, the adjusting groove is provided in the first fastener and the clamping part is provided on an inner groove wall of the adjusting groove. Therefore, by providing the adjusting groove in the first fastener and then adopting the structure of the sheet-like base part of the cable clip, the overall length of the tying-free network module will not be increased because the structure for fixing the clamping part needs to be separately provided in the tying-free network module. Moreover, since the adjusting groove is provided in the first fastener, the positioning of the cable can be quickly realized by turning the first fastener.

Further, a cable holder is detachably provided in the accommodating cavity and an arc-shaped edge b opposite to the positioning edge is provided on one side of the cable holder close to the base part.

Further, a link function core is further provided in the accommodating cavity.

Further, the link function core includes a crimping terminal part, a PCB board, a group of clamping blades and a function core, one end of each clamping blade is provided with a crimping spot-faced hole, the other end is provided with a group of cable piercing slopes, the crimping terminal part includes clamping blade mounting grooves, the clamping blades are mounted in the corresponding clamping blade mounting grooves in the crimping terminal part, one end of the function core is provided with a group of spot-faced crimping ends, and the function core and the clamping blades are crimped into corresponding slots in the PCB board through the spot-faced crimping ends.

Further, one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

Further, the plug-in interface is provided with a dustproof mechanism. Therefore, dust from can be prevented from entering the network module.

The present application further provides a cable gland, including a main gland body, a through hole for a cable to pass through being provided in the main gland body, wherein at least one clamping part is provided on the main gland body, the clamping part includes a clamping protrusion and the clamping part is used to be fit with a cable clip so that the cable clip moves towards a direction close to a cable.

Further, a cable mounting through hole is provided in a center of the cable gland, at least one cable mounting groove, at least one pair of mounting positioning grooves and at least one cable gland mounting positioning column are provided in a bottom of the cable gland, and the cable gland further includes a cable crimping surface provided adjacent to the cable mounting groove.

The present application further provides a tying-free network module, which includes the cable gland.

Figure 1:
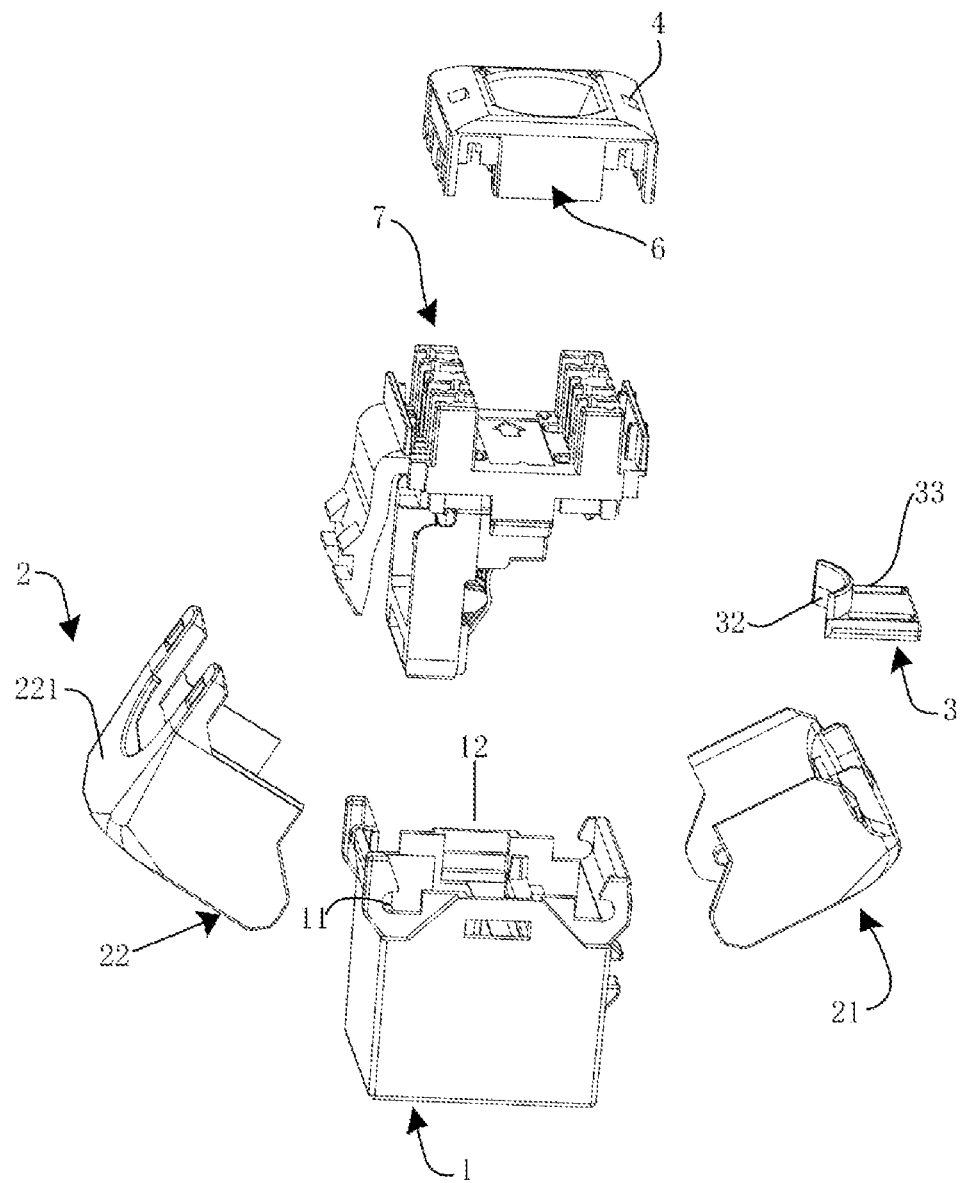
FIG. 1 is an exploded view of a tying-free network module in an implementation mode according to embodiment 1 of the present application.

In the drawings:
1—female seat; 11—fastener hanging groove; 12—mounting port; 13—plug—in interface; 131—dustproof mechanism; 14—hook; 2—fastener part; 21—first fastener; 211—upper cover plate; 22—second fastener; 221—arc—shaped edge a; 222—clamping port; 23—opening; 24—fastener hanging shaft;
3—cable clip; 31—base part; 311—clamping groove; 3111—guide slope; 3112—backstop surface; 32—positioning edge; 33—clamping edge; 34—sliding groove; 35—limiting clamping point;
4—clamping part; 41—clamping protrusion; 411—clamping surface; 412—stop surface; 5—adjsuting groove; 51—slider; 52—mounting plate; 6—cable gland; 61—adjusting gap; 62—main gland body; 63—cable mounting groove; 64—mounting positioning groove; 641—cable crimping surface; 65—mounting positioning column of cable gland;
7—link function core; 71—crimping terminal part; 72—PCB board; 73—clamping blade; 74—functiona core; 8—cable holder; 81—arc—shaped edge b; 82—cable holder fixation clamping hook; 9—cable.

DESCRIPTION OF THE EMBODIMENTS

The exemplary embodiments of the present application will be described in detail below with reference to the drawings, so that the advantages and features of the present application can be more easily understood by those skilled in the art, and thus the scope of protection of the present application can be more clearly defined.

Embodiment 1

Referring to FIG. 1, this embodiment provides a tying-free network module, which includes a female seat 1 and a fastener part 2 connected with the female seat 1. The female seat and the fastener part can be fastened together to form an accommodating cavity. A link function core 7, a cable clip 3 and a clamping part 4 are provided in the accommodating cavity.

In the present application, the fastener part 2 is provided with a through hole for a cable to pass through. The fastener part 2 includes at least one first fastener 21 hinged with the female seat 1 and rotatable relative to the female seat 1.

Figure 2:
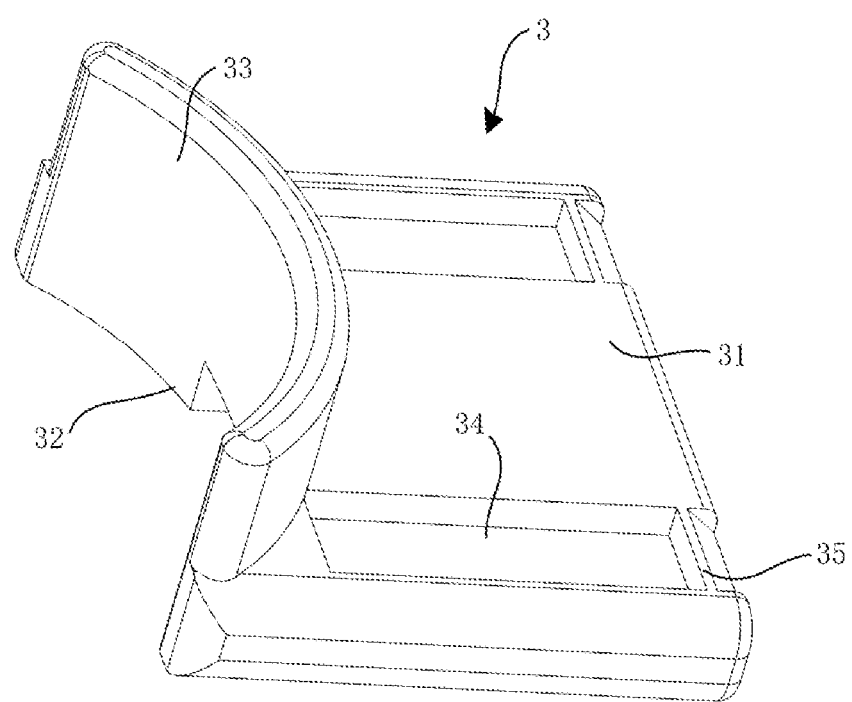
FIG. 2 is a schematic 3D structural diagram of a cable clip according to embodiment 1 of the present application.
Figure 3:
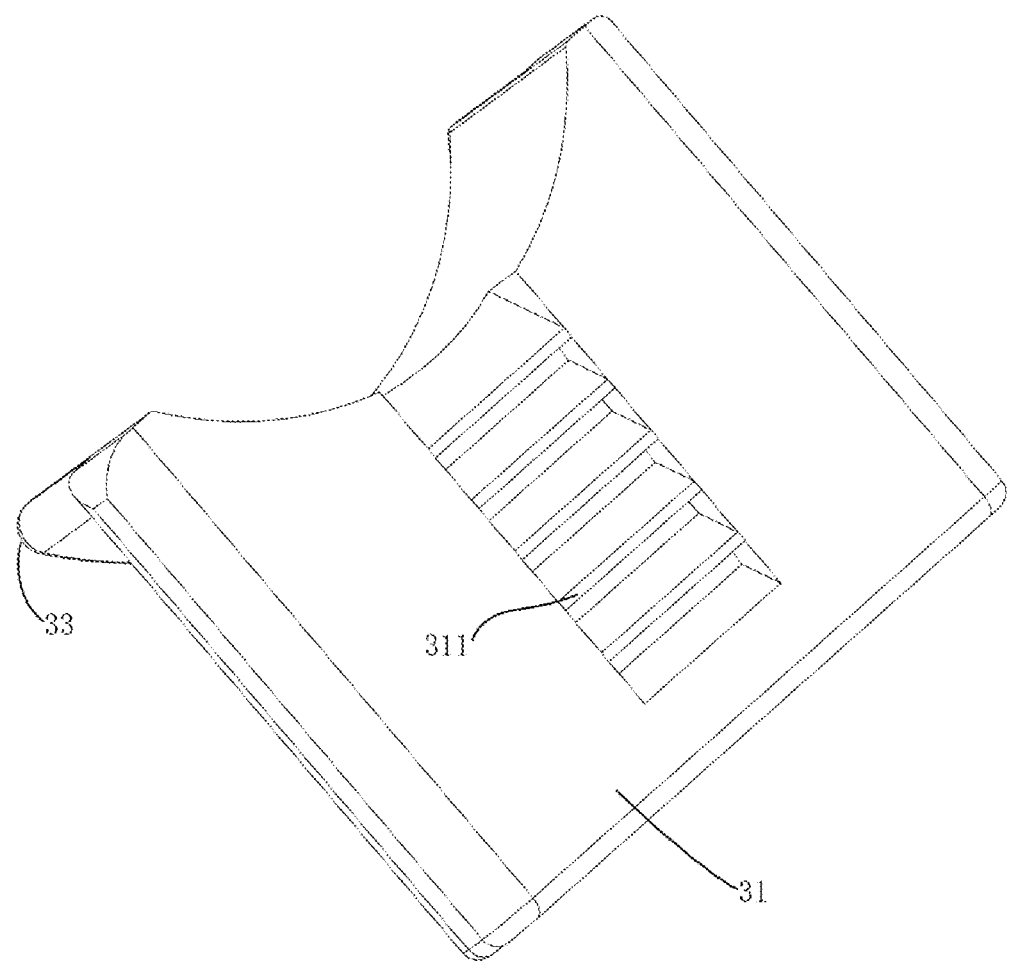
FIG. 3 is a schematic 3D structural diagram of a cable clip in another angle of view according to an embodiment of the present application.

Referring to FIG. 2 and FIG. 3, in the present application, the cable clip 3 is capable of moving towards a direction close to or far away from the cable passing through the through hole in the fastener part 2. The cable clip 3 includes a sheet-shaped base part 31. An arc-shaped positioning edge 32 is provided on one side of the base part close to the cable. At least two clamping grooves 311 are provided in at least one side surface of the base part 31. When the cable is clamped by using the cable clip 3, the cable clip 3 is provided in a direction perpendicular to the cable.

Figure 4:
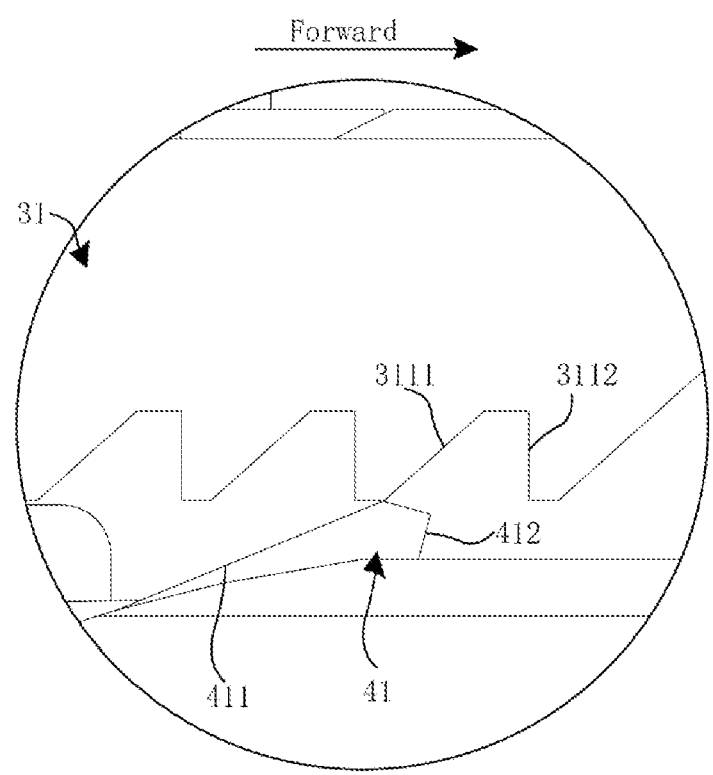
FIG. 4 illustrates a schematic structural diagram when a clamping groove of a cable clip is to be fit with a clamping protrusion according to embodiment 1 of the present application.
Figure 5:
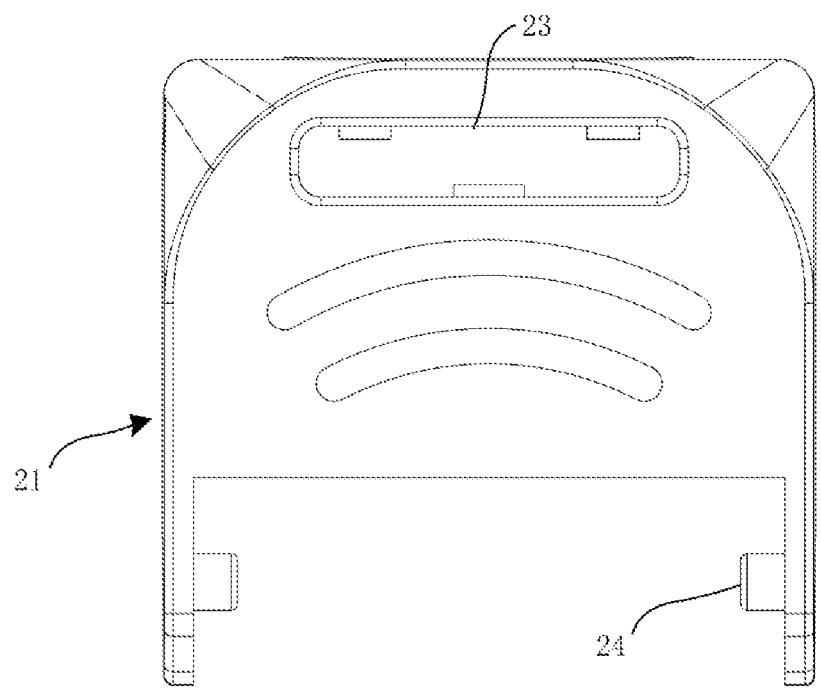
FIG. 5 illustrates a schematic structural diagram of an opening in a first fastener according to embodiment 1 of the present application.

Referring to FIG. 4, in the present application, the clamping part 4 is provided with at least one clamping protrusion 41 capable of being fit with the clamping grooves 311. In the present application, an opening 23 (as illustrated in FIG. 5) is provided in the fastener part 2 at a position corresponding to one end of the base part 31 of the cable clip 3 far away from the cable. A tool is used and passed through the opening 23 to apply an acting force to the cable clip 3 so that the cable clip 3 is moved towards the direction of the cable. In the present application, by providing the cable clip Sand fitting the clamping groove 311 in the cable clip 3 with the clamping part 4, the clamping between the cable clip 3 and the cable is realized without providing a tying structure at the end of the tying-free network module. In addition, in the present application, the cable clip 3 is located in the tying-free network module, so it is no longer necessary to separately provide a clamp structure for tying the cable at the outer end of the network module. Therefore, the overall length of the tying-free network module is smaller. Since the base part 31 of the cable clip 3 is in a sheet shape, the overall length of the tying-free network module is minimized. When the cable is clamped, it is only necessary to push the cable clip 3 towards the axis of the cable, and the cable can be quickly clamped through the fitting of the clamping groove 311 and the clamping protrusion 41.

In some implementation modes of the present application, the width of the gap at the opening 23 may be smaller than the thickness of the base part 31, so that the cable clip 3 can be prevented from protruding from the opening 23. In other possible implementation modes, the width of the gap at the opening 23 may be larger than the thickness of the base part 31.

In some implementation modes, the cable clip 3 further includes a clamping edge 33 (as illustrated in FIG. 2) provided along the positioning edge 32 and connected with the base part 31. The clamping edge 33 extends along a length direction of the cable, and the clamping edge 33 extends towards one side surface of the base part 31 far away from the side surface provided with the clamping groove 311. Therefore, the cable clip 3 clamps the cable through the fitting between the positioning edge 32 provided on one side surface and the clamping protrusion 41. In addition, since the extension direction of the clamping edge 33 is directed towards the other side surface of the base part 31 of the cable clip 3, the inner space of the tying-free network module can be effectively utilized, the overall length along the length direction of the cable can be reduced, and the cable can be fully fixed.

Figure 13:
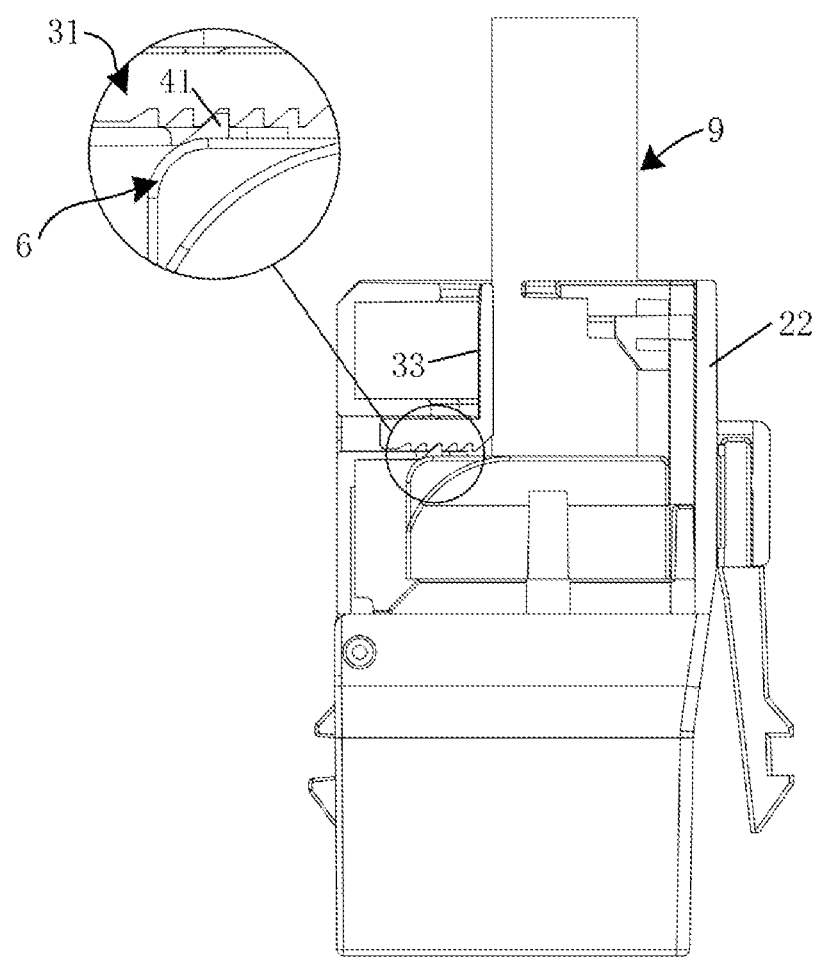
FIG. 13 is a schematic semi-sectional structural diagram of a tying-free network module according to embodiment 1 of the present application.
Figure 14:
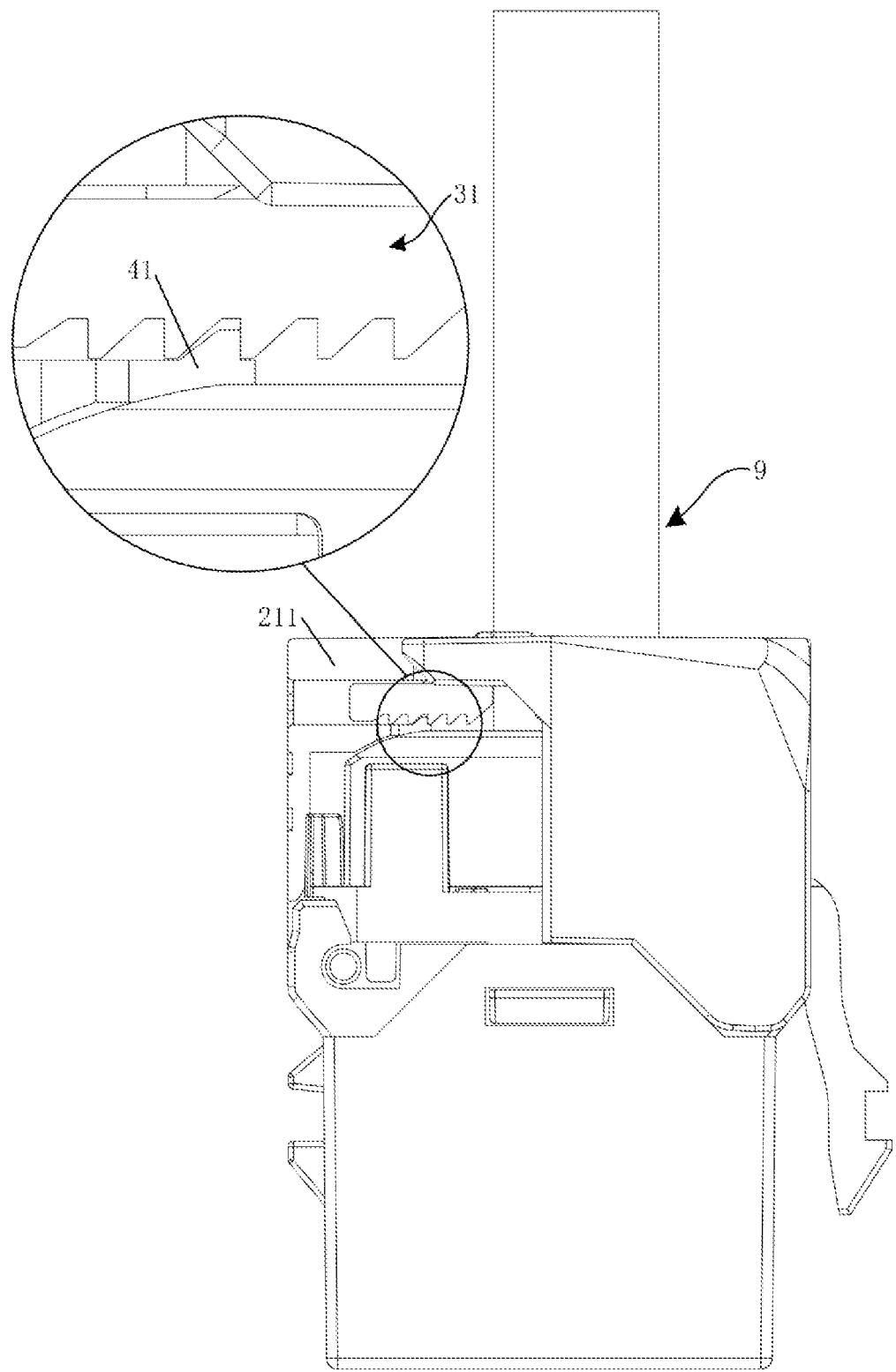
FIG. 14 is a schematic semi-sectional structural diagram of a tying-free network module according to embodiment 2 of the present application.

Further referring to FIGS. 4, 13 and 14, in some implementation modes of the present application, each clamping groove 311 is provided with a guide slope 3111 and a backstop surface 3112, the clamping protrusion 41 is provided with a clamping surface 411 and a stop surface 412, and the backstop surface 3112 of the clamping groove 311 is capable of abutting against the stop surface 412 of the clamping protrusion 41. Therefore, during clamping, the guide slope 3111 of the clamping groove 311 contacts the clamping surface 411 of the clamping protrusion 41 and moves forward along the clamping surface 411 to clamp the clamping protrusion 41 into the groove body of the clamping groove 311; after the cable is clamped, when the base part 31 of the cable clip 3 moves in a direction far away from the cable under the expansion force of the cable, the backstop surface 3112 of the clamping groove 311 abuts against the stop surface 412 of the clamping protrusion 41, thus ensuring that the cable clip 3 does not retreat and realizing the clamping and fixation of the cable.

Figure 6:
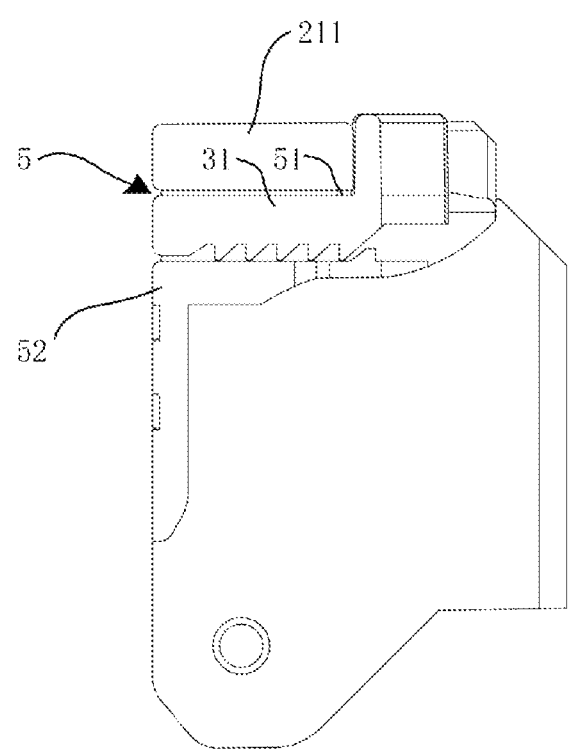
FIG. 6 is a schematic diagram of a fitting relationship between a base part and an adjusting groove according to embodiment 1 of the present application.

Referring to FIG. 6, in some implementation modes of the present application, an adjusting groove 5 fit with the base part 31 is further provided in the accommodating cavity, and the base part 31 is located in the adjusting groove 5 and is capable of moving in the adjusting groove along the adjusting groove 5 towards a direction close to or far away from the cable.

In some implementation modes of the present application, at least one sliding groove 34 is further provided in the base part 31, and a slider 51 fit and connected with the sliding groove 34 is provided on an inner side of a groove wall of the adjusting groove 5. The slider 51 can be fit into the sliding groove 34. Therefore, when the cable clip 3 moves towards the cable, the slider 51 is fit with the sliding groove 34 and moves along the sliding groove 34, thus ensuring that the stable movement of the cable clip 3 towards the cable and achieving the alignment when the cable is clamped. A limiting clamping point 35 (as illustrated in FIG. 2) is further provided at one end of the base part 31 far away from the positioning edge 32 at the end of the sliding groove 34, so that the cable clip is not separated from the main body of the network module.

In some implementation modes of the present application, a cable gland 6 is further provided in the accommodating cavity, and the clamping part 4 is provided on the cable gland 6. Therefore, after the base part 31 of the cable clip 3 is clamped with the clamping part 4, even if the fastener part 2 is opened, the cable can be firmly fixed. Moreover, the cable gland 6 is a structure that is originally provided in the network module in the conventional technology, so that the length of the main body of the network module does not change significantly due to the provision of the clamping part 4.

Figure 7:
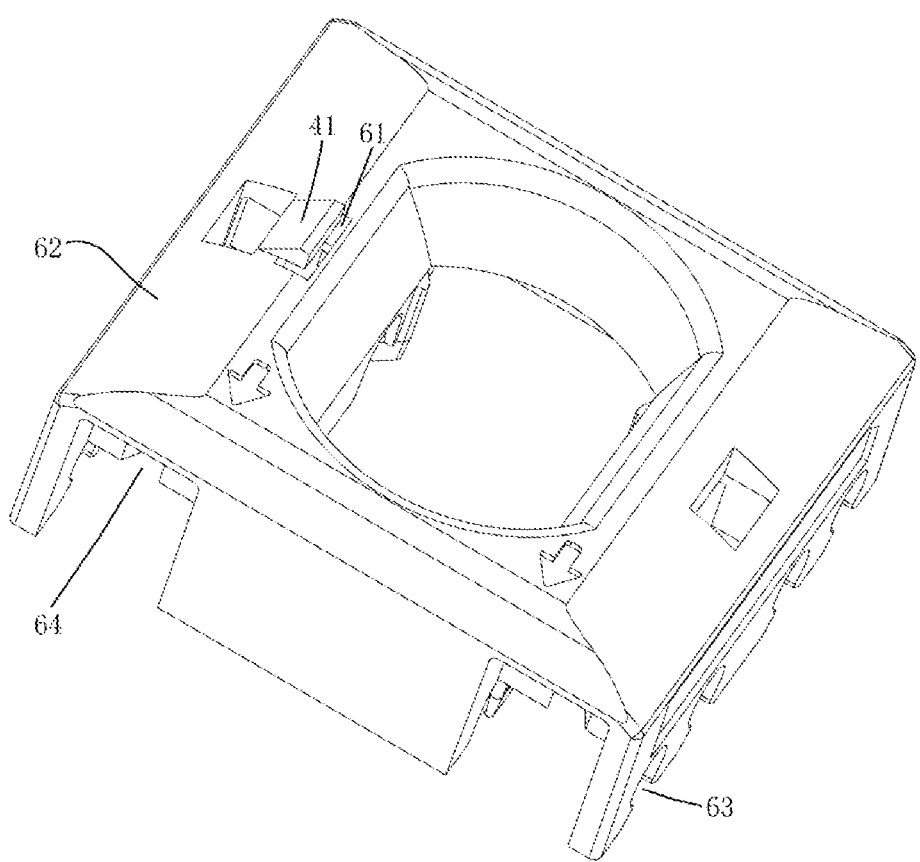
FIG. 7 is a schematic 3D structural diagram of a cable gland according to embodiment 1 of the present application.
Figure 8:
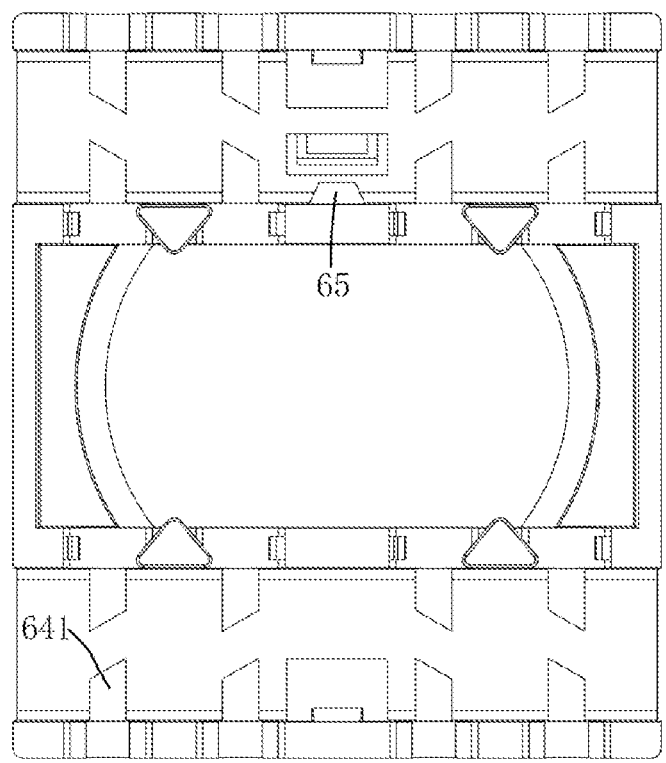
FIG. 8 is a top schematic structural diagram of a cable gland according to embodiment 1 of the present application.

Referring to FIG. 7 and FIG. 8, an adjusting gap 61 is further provided in the cable gland 6 at a position close to the clamping part 4. The adjusting gap 61 is located on a front side where the clamping part 4 is pressed down under the force. Therefore, when the cable clip is moved forward (the direction indicated by the arrow in FIG. 4 is "forward"), sufficient adjustment space can be provided when the clamping part 4 is under the force, thus ensuring that the clamping part 4 can be smoothly clamped into the target clamping groove 311 when the cable clip 3 is moved forward.

The number of the clamping parts 4 provided on the cable gland 6 is not limited to one, the clamping parts 4 are provided corresponding to each edge of the cable gland 6, and one cable clip 3 is provided corresponding to the clamping parts 4. Therefore, the cable clip 3 and the cable gland 6 can be clamped and fixed in a plurality of directions. In some possible implementation modes, at least two clamping parts 4 may be provided on the same side edge corresponding to the cable gland 6, and the length of the groove body of the clamping groove 311 in the cable clip 3 is increased correspondingly.

Figure 9:
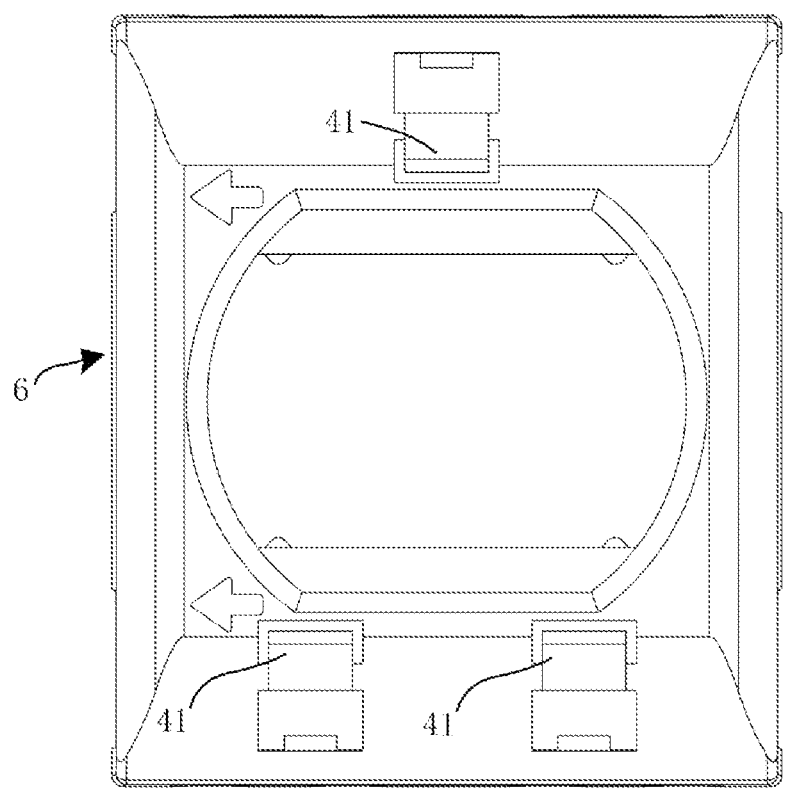
FIG. 9 is a schematic structural diagram when a cable gland is provided with a plurality of clamping protrusions according to embodiment 1 of the present application.

Referring to FIG. 9, in some implementation modes, the number of the clamping protrusion 41 is one and the clamping protrusion 41 is located at a position facing the center of the clamping groove 311. In other possible implementation modes, the number of the clamping protrusions 41 may be two, and the two clamping protrusions 41 are respectively located at positions close to two ends of the clamping groove 311 in the width direction.

Figure 10:
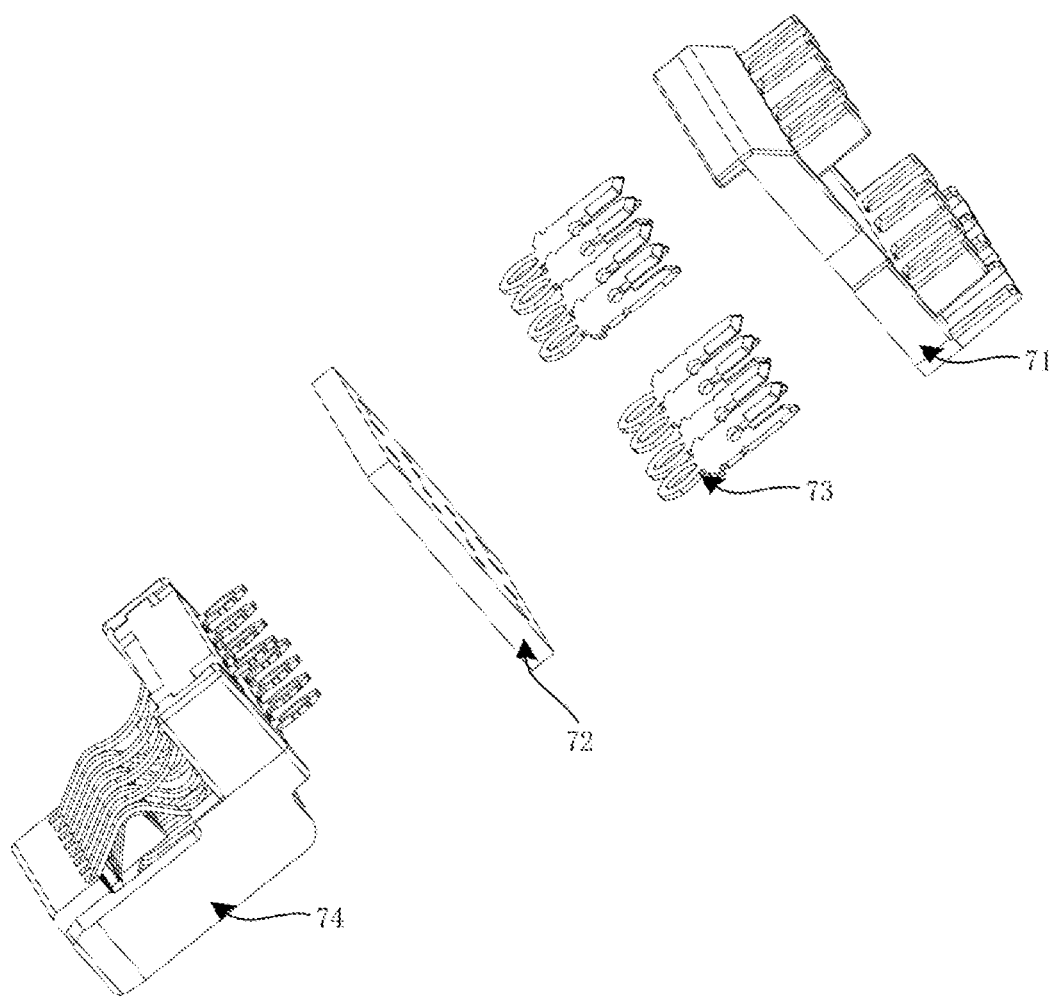
FIG. 10 is an exploded schematic structural diagram of a link function core according to embodiment 1 of the present application.

A link function core 7 is further provided in the accommodating cavity. Referring to FIG. 10, in some implementation modes, the link function core 7 includes a crimping terminal part 71, a PCB board 72, a group of clamping blades 73 and a function core 74, one end of each clamping blade 73 is provided with a crimping spot-faced hole, the other end is provided with a group of cable piercing slopes, the crimping terminal part 71 includes clamping blade 73 mounting grooves, the clamping blades 73 are mounted in the corresponding clamping blade 73 mounting grooves in the crimping terminal part 71, one end of the function core 74 is provided with a group of spot-faced crimping ends, and the function core 74 and the clamping blades 73 are crimped into corresponding slots in the PCB board 72 through the spot-faced crimping ends. In the present application, the functional core 74 may be a 180-degree or 90-degree function core 74.

In some implementation modes of the present application, the fastener part 2 further includes a second fastener 22 capable of being clamped with the first fastener 21. The first fastener 21 and the second fastener 22 are fit with each other to form a through hole for the cable to pass through.

Referring to FIG. 1 again, in some implementation modes, the second fastener 22 is separately connected with the female seat 1 and rotatably connected with the female seat 1, that is, both the first fastener 21 and the second fastener 22 are rotatably connected with the female seat 1. Correspondingly, two groups of fastener hanging grooves 11 are provided in the female seat 1, and fastener hanging shafts 24 as illustrated in FIG. 5) are respectively provided on the first fastener 21 and the second fastener 22. Therefore, through the fitting between the fastener hanging shafts 24 and the fastener hanging grooves 11, the first fastener 21 and the second fastener 22 can be respectively connected with the two groups of fastener hanging grooves 11, thus realizing the connection between the fastener part 2 and the female seat 1. Since the cable clip 3 is provided on the side close to the first fastener 21, the side of the second fastener 22 close to the first fastener 21 is correspondingly provided with an arc-shaped edge a221 opposite to the clamping edge 33 of the base part 31 of the cable clip 3, so that the cable is clamped through the fitting between the arc-shaped edge a221 and the clamping edge 33.

Figure 11:
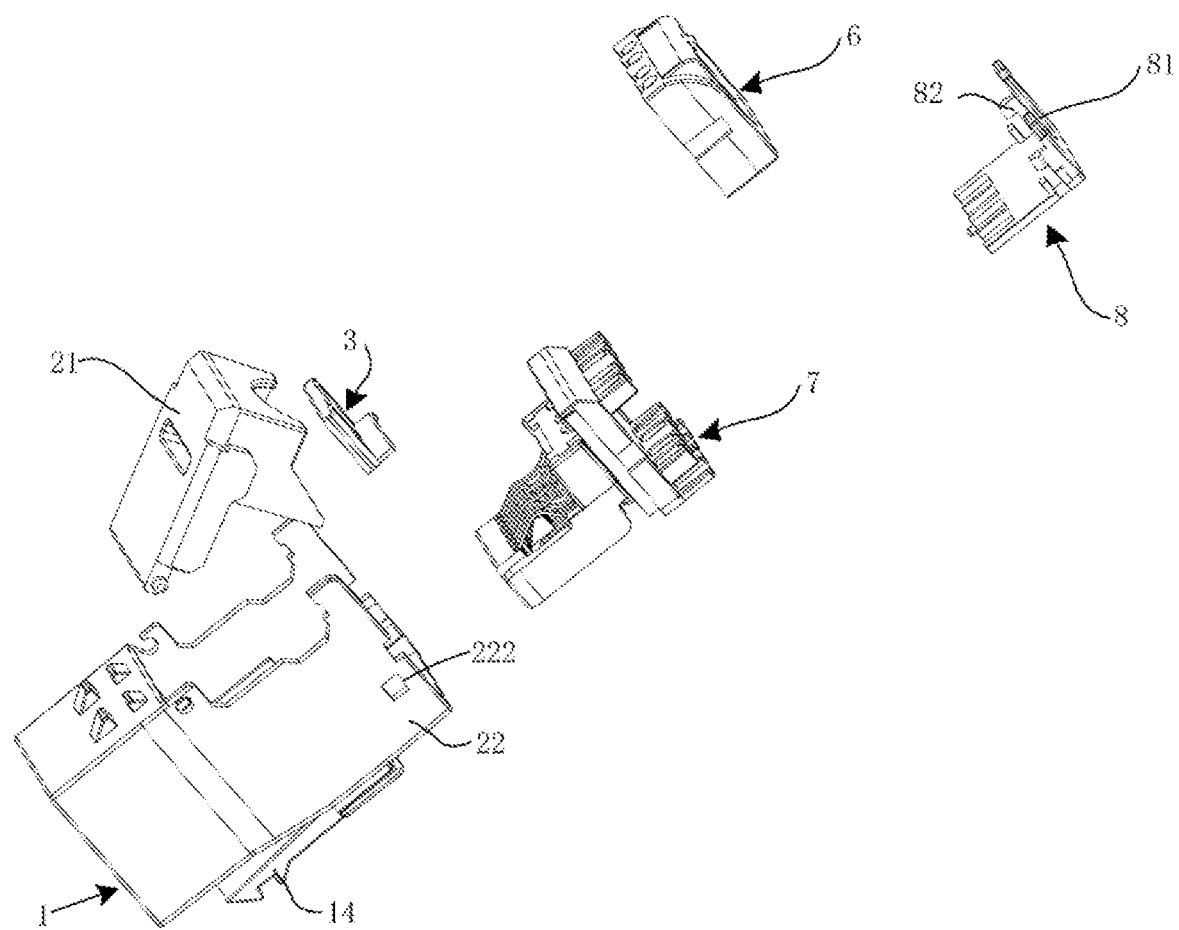
FIG. 11 is an exploded view of a tying-free network module in another implementation mode according to embodiment 1 of the present application.

Referring to FIG. 11, in other possible implementation modes, the second fastener 22 may also be integrally connected with the female seat 1, and a group of fastener hanging grooves 11 are correspondingly provided in the edge of the female seat 1 close to the second fastener 22 to realize the rotatable connection between the first fastener 21 and the female seat 1. A cable holder 8 detachably connected with the second fastener 22 is further provided in the accommodation cavity. An arc-shaped edge b81 opposite to the positioning edge 32 is provided on one side of the cable holder 8 close to the base part 31. Therefore, the cable holder 8 can ensure a good fixing effect of the cable through the fitting between the arc-shaped edge b81 and the cable clip 3. A main body of the cable holder 8 is provided with two cable holder fixation clamping hooks 82, and clamping ports 222 are correspondingly provided on the second fastener 22. The clamping between the cable holder 8 and the second fastener 22 is realized through the fitting between the clamping ports 222 and the cable holder fixation clamping hooks 82.

Figure 12:
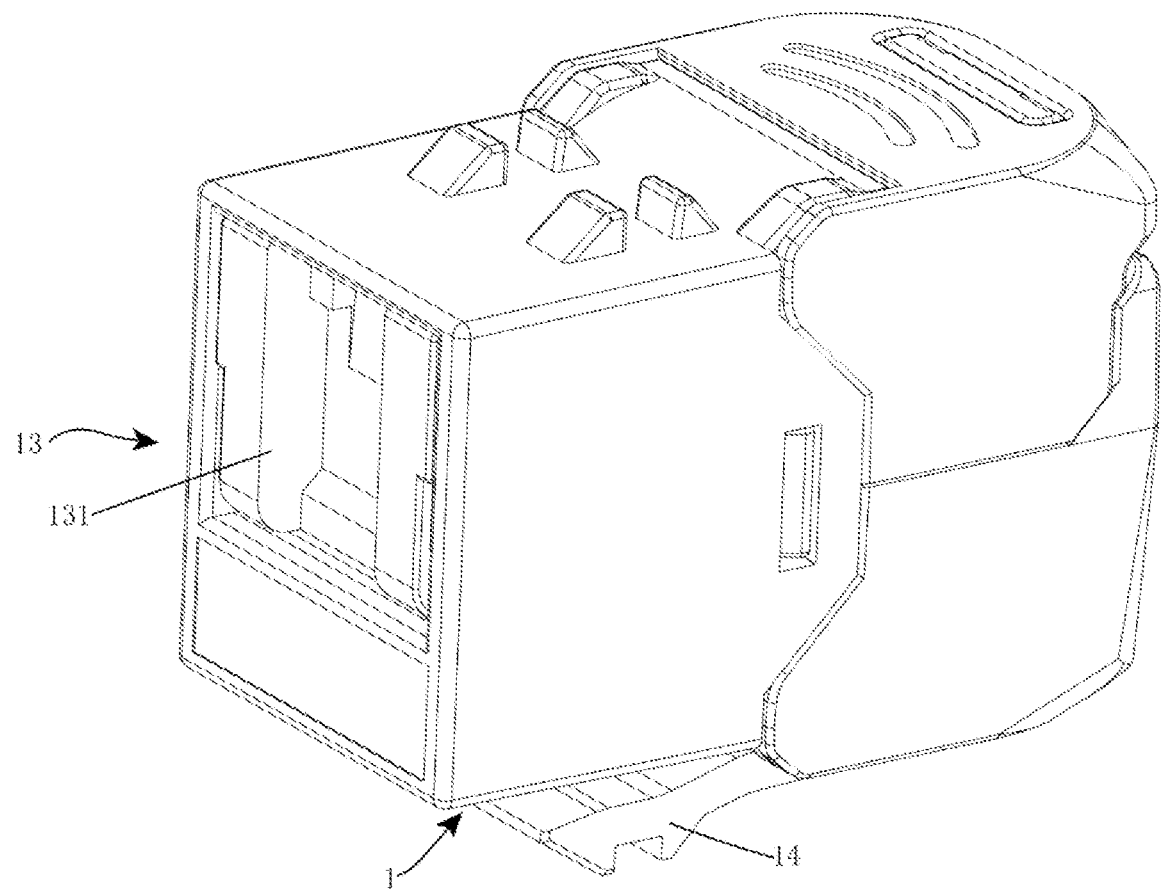
FIG. 12 is a schematic 3D structural diagram of a tying-free network module according to embodiment 1 of the present application.

In the present application, referring to FIG. 12, one end of the female seat 1 for connecting with the cable is provided with a mounting port 12, and the other end opposite to the mounting port 12 is provided with a plug-in interface 13. The clamping groove 311 of the cable clip 3 in this embodiment is located in one side of the base part 31 close to the plug-in interface 13. Obviously, the clamping groove 311 may also be provided in one side of the base part 31 close to the mounting port 12.

In some implementation modes of the present application, at least one hanging hook 14 for connecting with other mechanisms is further provided on an outer wall of the tying-free network module provided by the present application. The hanging hook 14 may be made of metal, plastic, etc.

In some implementation modes of the present application, the plug-in interface is provided with a dustproof mechanism 131. The dustproof mechanism 131 includes a rotatable dustproof door, so as to prevent dust from entering the plug-in interface 13.

Embodiment 2

Referring to FIG. 14, the only difference of this embodiment from embodiment 1 lies in that the clamping part 4 is provided on an inner groove wall of the adjusting groove 5, instead of the cable gland 6. Compared with FIG. 13, which is a schematic semi-sectional structural diagram when the clamping part 4 is provided on the cable gland 6 and in which a 90-degree core is used as the function core, a 180-degree function core is used as the function core in FIG. 14. Very obviously, the function core may be freely selected and replaced as required.

Therefore, by providing the adjusting groove 5 in the first fastener 21 and adopting the structure of the sheet-like base part 31 of the cable clip 3, the overall length of the tying-free network module will not be increased because the structure for fixing the clamping part 4 needs to be separately provided in the tying-free module. Moreover, since the adjusting groove 5 is provided in the first fastener 21, the rough positioning of the cable can be quickly realized by turning the first fastener 21.

In this embodiment, the adjusting groove 5 is a structure in which a mounting plate 52 is provided on an inner wall of the first fastener 21, and the mounting plate 52 is provided in a direction substantially parallel to the outer surface of the end of the first fastener 21 close to the plug-in interface, whereby the adjusting groove 5 is formed between the mounting plate 52 and an upper cover plate 211 of the first fastener 21.

In some implementation modes of the present application, the clamping part 4 is arranged on one side of the mounting plate 52 close to the upper cover plate 211 of the first fastener 21, and the number of the clamping parts 4 may be one or two or more. Correspondingly, the clamping grooves 311 of the cable clip 3 are provided in the side far away from the upper cover plate 211, and the width of the clamping grooves 311 in the base part 31 of the cable clip 3 is adjusted according to the provision position and the number of the clamping parts 4. For example, if only one clamping part 4 is provided in a region close to the center line of the mounting plate 52, it is only necessary to provide the clamping groove 311 in the center of the base part 31. When there are two clamping parts 4 provided on the mounting plate 52, the width of the clamping grooves 311 is adjusted correspondingly to ensure that the clamping grooves 311 can fully clamp with the clamping parts 4.

Figure 15:
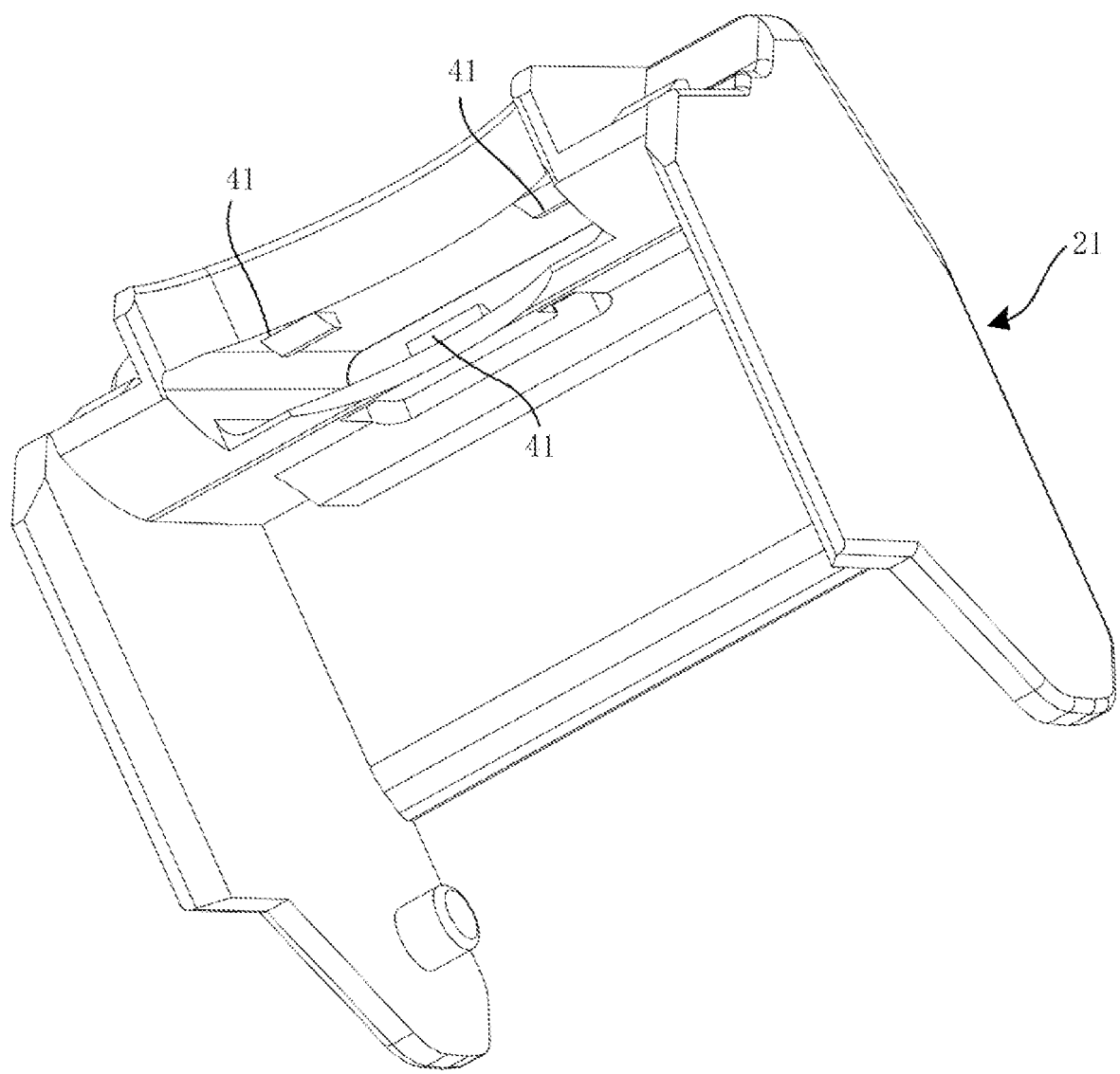
FIG. 15 is a schematic diagram of a position where a clamping part is provided on a second fastener in a tying-free network module according to embodiment 2 of the present application.

Referring to FIG. 15, in other possible implementation modes of the present application, the clamping protrusion 41 of the clamping part 4 may also be provided on an inner side of the upper cover plate 211, and correspondingly the clamping groove 311 in the cable clip 3 may be provided in the side close to the upper cover plate 211. The clamping parts 4 may also be provided on the inner side of the upper cover plate 211 and the side of the mounting plate 52 close to the upper cover plate 211 at the same time, and correspondingly the position of the clamping grooves 311 in the base part 31 of the cable clip 3 is adjusted to match the clamping parts 4.

In the present application, the mounting plate 52 is substantially at the same position as the side surface of the cable gland 6 close to the mounting port 12, and correspondingly, the clamping part 4 is provided at one end of the mounting plate 52 close to the mounting port 12. Therefore, the overall length of the tying-free network module can be minimized even though the clamping part 4 is provided on the mounting plate 52.

Embodiment 3

Referring to FIG. 7 to FIG. 9, this embodiment provides a cable gland 6, which includes a main gland body 62. A through hole for a cable to pass through is provided in the main gland body 62. At least one clamping part 4 is provided on the main gland body 62. The clamping part 4 includes a clamping protrusion 41 and the clamping part 4 is used to be fit with a cable clip 3 so that the cable clip 3 moves towards a direction close to a cable.

A cable mounting through hole is provided in a center of the cable gland 6. At least one cable mounting groove 63, at least one pair of mounting positioning grooves 64 and at least one cable gland mounting positioning column 65 are provided in a bottom of the cable gland 6. A cable crimping surface is further provided beside the cable mounting groove 63.

Embodiment 4

This embodiment provides a tying-free network module, which includes the cable gland 6 in embodiment 3. The cable passes through the through hole from a top to a bottom of the cable gland 6, is pressed into the corresponding cable mounting groove 63, and is placed on the corresponding cable crimping surface 641. The cable gland 6 is provided on the crimping terminal of the link function core 7 through the mounting positioning column. The quick mounting of the cable is completed through the crimping of the fastener part 2. The tying-free network module provided by this embodiment realizes the fast clamping of the cable by providing the clamping part 4 on the cable gland and adopting the fitting between the cable clip 3 and the clamping part. It makes use of the original structure of the network module, and does not need to provide a clamp, a cable tie and other structures at the end of the network module, thus reducing the overall length of the network module.

The above embodiments are only intended to describe the technical concept and characteristics of the present application, so that those skilled in the art can understand the content of the present application and implement it. However, the scope of protection of the present application is not limited thereto. Any equivalent changes or modifications made according to the spirit and essence of the present application should be included in the scope of protection of the present application.

The invention claimed is:

1. A tying-free network module, comprising a female seat and a fastener part connected with the female seat, the female seat and the fastener part forming an accommodating cavity, the fastener part being provided with a through hole for a cable to pass through, the fastener part comprising at least one first fastener hinged with the female seat, wherein the tying-free network module further comprises:
   a cable clip, the cable clip being located in the accommodating cavity, the cable clip being capable of moving towards a direction close to or far away from the cable passing through the through hole in the fastener part, the cable clip comprising a sheet-shaped base part, an arc-shaped positioning edge being provided on one side of the base part close to the cable, at least two clamping grooves being provided in at least one side surface of the base part; and
   a clamping part, the clamping part being provided with at least one clamping protrusion capable of being fit with the clamping grooves, the clamping part being provided in the accommodating cavity of the tying-free network module,
   an opening being provided in the fastener part at a position corresponding to one end of the base part of the cable clip far away from the cable, the cable clip being moved towards the direction of the cable by passing through the opening and applying a force to the cable clip.

2. The tying-free network module according to claim 1, wherein the cable clip further comprises a clamping edge provided along the positioning edge and connected with the base part, the clamping edge extends along a length direction of the cable, and the clamping edge extends towards one side surface of the base part far away from the side surface provided with the clamping grooves.

3. The tying-free network module according to claim 2, wherein each clamping groove is provided with a guide slope and a backstop surface, the clamping protrusion is provided with a clamping surface and a stop surface, and the backstop surface of the clamping groove is capable of abutting against the stop surface of the clamping protrusion.

4. The tying-free network module according to claim 1, wherein an adjusting groove fit with the base part is further provided in the accommodating cavity, and the base part is capable of moving along the adjusting groove towards a direction close to or far away from the cable.

5. The tying-free network module according to claim 4, wherein at least one sliding groove is further provided in the base part, a fastener part and a slider fitted and connected with the sliding groove is provided in the adjusting groove.

6. The tying-free network module according to claim 1, wherein a cable gland is further provided in the accommodating cavity, and the clamping part is provided on the cable gland.

7. The tying-free network module according to claim 6, wherein an adjusting gap is further provided in the cable gland at a position close to the clamping part.

8. The tying-free network module according to claim 4, wherein the adjusting groove is provided in the first fastener and the clamping part is provided on an inner groove wall of the adjusting groove.

9. The tying-free network module according to claim 1, wherein a cable holder is detachably provided in the accommodating cavity and an arc-shaped edge b opposite to the positioning edge is provided on one side of the cable holder close to the base part.

10. The tying-free network module according to claim 1, wherein a link function core is further provided in the accommodating cavity.

11. The tying-free network module according to claim 10, wherein the link function core comprises a crimping terminal part, a PCB board, a group of clamping blades and a function core, one end of each clamping blade is provided with a crimping spot-faced hole, the other end is provided with a group of cable piercing slopes, the crimping terminal part comprises clamping blade mounting grooves, the clamping blades are mounted in the corresponding clamping blade mounting grooves in the crimping terminal part, one end of the function core is provided with a group of spot-faced crimping ends, and the function core and the clamping blades are crimped into corresponding slots in the PCB board through the spot-faced crimping ends.

12. The tying-free network module according to claim 1, wherein one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

13. The tying-free network module according to claim 12, wherein the plug-in interface is provided with a dustproof mechanism.

14. The tying-free network module according to claim 2, wherein an adjusting groove fit with the base part is further provided in the accommodating cavity, and the base part is capable of moving along the adjusting groove towards a direction close to or far away from the cable.

15. The tying-free network module according to claim 3, wherein an adjusting groove fit with the base part is further provided in the accommodating cavity, and the base part is capable of moving along the adjusting groove towards a direction close to or far away from the cable.

16. The tying-free network module according to claim 2, wherein a cable gland is further provided in the accommodating cavity, and the clamping part is provided on the cable gland.

17. The tying-free network module according to claim 3, wherein a cable gland is further provided in the accommodating cavity, and the clamping part is provided on the cable gland.

18. The tying-free network module according to claim 5, wherein a cable gland is further provided in the accommodating cavity, and the clamping part is provided on the cable gland.

19. The tying-free network module according to claim 2, wherein a cable holder is detachably provided in the accommodating cavity and an arc-shaped edge b opposite to the positioning edge is provided on one side of the cable holder close to the base part.

20. The tying-free network module according to claim 3, wherein a cable holder is detachably provided in the accommodating cavity and an arc-shaped edge b opposite to the positioning edge is provided on one side of the cable holder close to the base part.

21. The tying-free network module according to claim 5, wherein a cable holder is detachably provided in the accommodating cavity and an arc-shaped edge b opposite to the positioning edge is provided on one side of the cable holder close to the base part.

22. The tying-free network module according to claim 7, wherein a cable holder is detachably provided in the accommodating cavity and an arc-shaped edge b opposite to the positioning edge is provided on one side of the cable holder close to the base part.

23. The tying-free network module according to claim 2, wherein a link function core is further provided in the accommodating cavity.

24. The tying-free network module according to claim 3, wherein a link function core is further provided in the accommodating cavity.

25. The tying-free network module according to claim 5, wherein a link function core is further provided in the accommodating cavity.

26. The tying-free network module according to claim 7, wherein a link function core is further provided in the accommodating cavity.

27. The tying-free network module according to claim 2, wherein one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

28. The tying-free network module according to claim 3, wherein one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

29. The tying-free network module according to claim 5, wherein one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

30. The tying-free network module according to claim 7, wherein one end of the female seat for connecting with the fastener part is provided with a mounting port, the other end opposite to the mounting port is provided with a plug-in interface, and one end of the female seat close to the mounting port is provided with a fastener part hanging groove connected with at least the fastener part.

* * * * *